United States Patent
Fujita et al.

(10) Patent No.: US 10,518,213 B2
(45) Date of Patent: Dec. 31, 2019

(54) CARBON DIOXIDE CAPTURING APPARATUS, CARBON DIOXIDE CAPTURING METHOD, AND AMINE COMPOUND CAPTURING METHOD

(71) Applicant: Kabushiki Kaisha Toshiba, Minato-ku (JP)

(72) Inventors: Koshito Fujita, Yokohama (JP); Masatoshi Hodotsuka, Saitama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 315 days.

(21) Appl. No.: 14/272,734

(22) Filed: May 8, 2014

(65) Prior Publication Data
US 2014/0241967 A1 Aug. 28, 2014

Related U.S. Application Data

(63) Continuation of application No. PCT/JP2012/081148, filed on Nov. 30, 2012.

(30) Foreign Application Priority Data

Dec. 1, 2011 (JP) .................................. 2011-263689

(51) Int. Cl.
| | |
|---|---|
| *B01D 53/14* | (2006.01) |
| *B01D 53/62* | (2006.01) |
| *C01B 32/50* | (2017.01) |

(52) U.S. Cl.
CPC ......... *B01D 53/62* (2013.01); *B01D 53/1412* (2013.01); *B01D 53/1418* (2013.01);
(Continued)

(58) Field of Classification Search
None
See application file for complete search history.

(56) References Cited

U.S. PATENT DOCUMENTS

| | | | |
|---|---|---|---|
| 2009/0193970 A1 | 8/2009 | Iijima | |
| 2010/0101416 A1* | 4/2010 | Akiyama | B01D 53/1425 95/193 |

(Continued)

FOREIGN PATENT DOCUMENTS

| | | |
|---|---|---|
| EP | 2 327 467 A1 | 6/2011 |
| JP | 2009-179546 A | 8/2009 |

(Continued)

OTHER PUBLICATIONS

International Search Report dated Feb. 19, 2013 for PCT/JP2012/081148 filed on Nov. 30, 2012 in English.
Office Action dated Apr. 2, 2015 in Australian Patent Application No. 2012343386.

(Continued)

*Primary Examiner* — Anita Nassiri-Motlagh
(74) *Attorney, Agent, or Firm* — Oblon, McClelland, Maier & Neustadt, L.L.P.

(57) ABSTRACT

In accordance with an embodiment, a carbon dioxide capturing apparatus includes a first absorbing unit, a regeneration unit, a water washing capturing unit, and a pre-amine capturing unit. The first absorbing unit brings a gas containing carbon dioxide into contact with an absorbing liquid containing an amine compound, and discharges the absorbing liquid which has absorbed carbon dioxide as a rich liquid. The regeneration unit releases a carbon dioxide gas from the rich liquid sent from the first absorbing unit. The water washing capturing unit captures the amine compound entrained in a decarbonated treatment gas sent from the first absorbing unit. The pre-amine capturing unit receives part of the rich liquid from the first absorbing unit, and traps the amine compound entrained in the decarbonated treatment gas by bringing the decarbonated treatment gas from the first absorbing unit into countercurrent contact with the part of the rich liquid.

8 Claims, 10 Drawing Sheets

(52) U.S. Cl.
CPC ..... *B01D 53/1425* (2013.01); *B01D 53/1475* (2013.01); *C01B 32/50* (2017.08); *B01D 2252/204* (2013.01); *Y02C 10/04* (2013.01); *Y02C 10/06* (2013.01); *Y02P 20/152* (2015.11)

(56) References Cited

U.S. PATENT DOCUMENTS

| | | |
|---|---|---|
| 2011/0041685 A1 | 2/2011 | Tanaka et al. |
| 2011/0110833 A1* | 5/2011 | Huang ............... B01D 53/1425 423/228 |
| 2011/0135550 A1 | 6/2011 | Nagayasu et al. |
| 2011/0146489 A1 | 6/2011 | Dube et al. |

FOREIGN PATENT DOCUMENTS

| | | | |
|---|---|---|---|
| JP | 2010-100491 A | 5/2010 | |
| JP | 2011-42554 A | 3/2011 | |
| JP | 2011-115724 A | 6/2011 | |
| WO | 2009/104744 A1 | 8/2009 | |

OTHER PUBLICATIONS

Combined Chinese Office Action and Search Report dated May 6, 2015 in Patent Application No. 201280056110.9 (with English language translation).

Extended Search Report dated Jun. 25, 2015 in European Patent Application No. 12852705.8.

Japanese Office Action dated Oct. 17, 2014, in Japan Patent Application No. 2013-547244 (with English translation).

\* cited by examiner

CARBON DIOXIDE CAPTURING APPARATUS, CARBON DIOXIDE CAPTURING METHOD, AND AMINE COMPOUND CAPTURING METHOD

CROSS REFERENCE TO RELATED APPLICATIONS

This application is based upon and claims the benefit of priority from the prior Japanese Patent Application No. 2011-263689, filed on Dec. 1, 2011, the entire contents of which are incorporated herein by reference.

FIELD

Embodiments described herein relate generally to a carbon dioxide capturing apparatus, a carbon dioxide capturing method, and an amine compound capturing method.

BACKGROUND

There have been suggested a method of bringing a combustion gas into contact with an amine absorbing liquid, and separating and capturing carbon dioxide in the combustion gas, and there have been suggested various methods of storing the collected carbon dioxide without releasing carbon dioxide to the atmosphere.

In a process that uses the amine absorbing liquid to separate and capture carbon dioxide, an amine compound (hereinafter referred to as "treatment gas entrained amine") is scattered to the atmosphere together with a decarbonated treatment gas, and is therefore needed to be efficiently captured.

SUMMARY OF THE INVENTION

In accordance with an embodiment, a carbon dioxide capturing apparatus includes a first absorbing unit, a regeneration unit, a water washing capturing unit, and a pre-amine capturing unit. The first absorbing unit brings a gas containing carbon dioxide into contact with an absorbing liquid containing an amine compound in such a manner that the absorbing liquid absorbs carbon dioxide, and discharges the absorbing liquid which has absorbed carbon dioxide as a rich liquid. The regeneration unit releases a carbon dioxide gas from the rich liquid sent from the first absorbing unit, thereby regenerating the absorbing liquid. The water washing capturing unit captures the amine compound entrained in a decarbonated treatment gas sent from the first absorbing unit. The pre-amine capturing unit is provided between the first absorbing unit and the water washing capturing unit, receives part of the rich liquid from the first absorbing unit, and traps the amine compound entrained in the decarbonated treatment gas by bringing the decarbonated treatment gas from the first absorbing unit into countercurrent contact with the part of the rich liquid.

DETAILED DESCRIPTION

First, a comparative example is described.

A carbon dioxide capturing apparatus (not shown) according to the comparative example is provided with water washing equipment which uses washing water to capture treatment gas entrained amine. However, the amine concentration in the washing water is low, and it is necessary to concentrate the washing water up to the concentration of an amine absorbing liquid (lean liquid) by a treatment such as distillation in order to reuse, as an absorbing liquid, the amine collected by the washing water. In a carbon dioxide capturing method that uses the lean liquid, how to reduce necessary energy is a significant challenge, whereas considerable energy is required for the concentration of the washing water. If the amine collected by the washing water is used as the lean liquid as it is, the amine concentration in the lean liquid gradually drops, and predetermined performance of the carbon dioxide capturing apparatus cannot be maintained. The quantity of required heat (energy) increases when carbon dioxide is separated and captured in the cycles of two processes: a process of absorbing carbon dioxide in an absorption tower; and a process of expelling the absorbed carbon dioxide from an absorbing liquid in a regeneration tower.

Since the treatment gas entrained amine is continuously trapped by the washing water, the amine concentration in the washing water rises along with the operating time of an amine capturing apparatus. Therefore, it is possible to reuse the amine by adding the washing water to the amine absorbing liquid after the amine concentration in the washing water has reached a concentration close to that of the amine absorbing liquid. However, force of the washing water for trapping amine weakens if the amine concentration in the washing water rises, so that much entrained amine is present in the treatment gas which has passed through the washing water. This leads to an increase in the amount of amine scattered to the atmosphere.

In the meantime, the inventors have found out that if the carbon dioxide concentration in the amine absorbing liquid is higher, the amount of the treatment gas entrained amine is smaller because the amine in the liquid is less volatile. The inventors have paid attention to this fact, and reached the following idea: a predetermined filling unit or shelf stage unit is provided between the water washing equipment and the absorption tower; part of a rich liquid containing a large amount of carbon dioxide from the absorption tower is drawn; the drawn rich liquid is then introduced into the filling unit or the shelf stage unit, and brought into countercurrent contact with the decarbonated treatment gas from the top of the absorption tower to trap the treatment gas entrained amine. The filling unit or the shelf stage unit is referred to as a pre-amine capturing unit.

Several embodiments will be described below with reference to the drawings mainly in connection with the pre-amine capturing unit. The same parts are provided with the same reference numerals throughout the drawings, and repeated explanations are appropriately omitted accordingly.

(1) Embodiment 1

Figure 1:
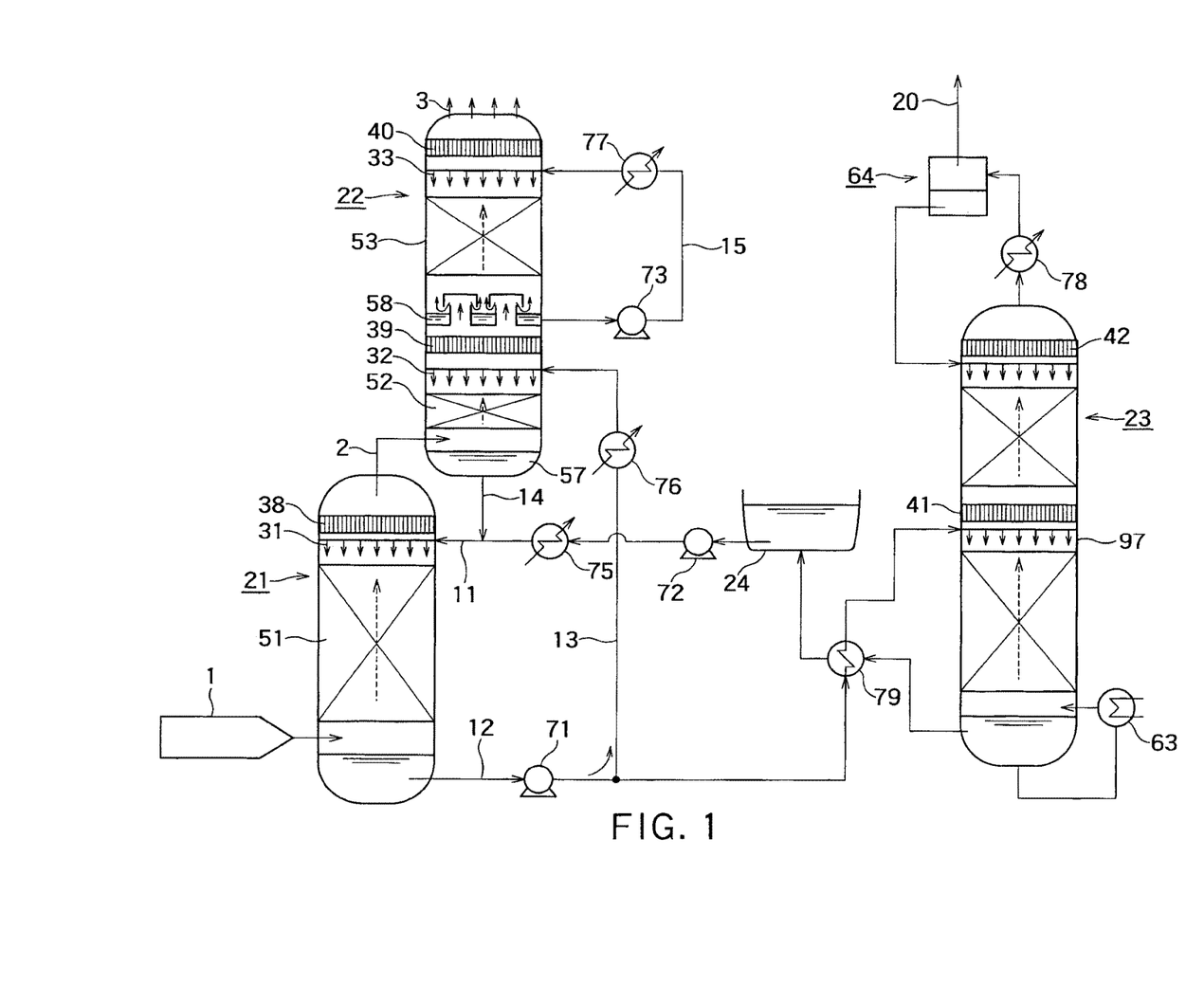
FIG. 1 is a diagram showing a schematic configuration of a carbon dioxide capturing apparatus according to Embodiment 1.

FIG. 1 is a diagram showing a schematic configuration of a carbon dioxide capturing apparatus according to Embodiment 1. The carbon dioxide capturing apparatus shown in FIG. 1 includes an absorption tower 21, a regeneration tower 23, an amine capturing tower 22, an absorbing liquid buffer tank 24, pumps 71 to 74, and heat exchangers 75 to 80.

A carbon dioxide absorbing liquid (lean liquid) 11 containing an amine compound for absorbing carbon dioxide is introduced into the absorption tower 21 from the absorbing liquid buffer tank 24 by the pump 72 through the top of the absorption tower 21. The lean liquid 11 is brought into contact with a carbon dioxide containing exhaust gas 1 which is introduced from the bottom of the absorption tower 21 so that carbon dioxide is absorbed in the lean liquid 11. Thus, carbon dioxide is absorbed and removed from the carbon dioxide containing exhaust gas 1. In the present embodiment, the absorption tower 21 corresponds to, for example, a first absorption unit.

The absorbing liquid which has absorbed carbon dioxide is sent as a rich liquid 12 from the absorption tower 21 to a rich liquid supply unit 97 of the regeneration tower 23 by the pump 71. The rich liquid 12 coming out of the absorption tower 21 at a temperature of about 40° C. to about 60° C. is heated in advance to about 90° C. to about 120° C. by the heat exchanger 79 before sent to the regeneration tower 23. After sent to the regeneration tower 23, the rich liquid 12 is heated to about 120° C. by a reboiler 63. As a result, carbon dioxide from the rich liquid is released from the regeneration tower 23 via two stages of filling units. In the present embodiment, the regeneration tower 23 corresponds to, for example, a regeneration unit.

As a result of the release of carbon dioxide from the rich liquid, the absorbing liquid is regenerated as the lean liquid 11 and then drawn from the regeneration tower 23. The drawn lean liquid 11 exchanges heat with the rich liquid 12 through the heat exchanger 79, and is thereby cooled and introduced into the absorbing liquid buffer tank 24. Demisters 41 and 42 are respectively provided at the tops of the two stages of filling units, and trap and collect amine absorbing liquid mist into the respective filling units.

Carbon dioxide which has been released from the regeneration tower 23 and which contains steam is cooled by the heat exchanger 78 and then introduced into a gas-liquid separator 64 where steam is separated from carbon dioxide. Thus the carbon dioxide is released to the outside of the carbon dioxide capturing apparatus from the gas-liquid separator 64. The steam separated by the gas-liquid separator 64 is returned to the regeneration tower 23 as carbonated water containing carbon dioxide.

Although the regeneration tower 23 includes the two stages of filling units in the aspect described in the example shown in FIG. 1, this is not a limitation. One stage of a filling unit or three or more stages of filling units may be provided depending on the scale of the carbon dioxide capturing apparatus.

The lean liquid 11 received in the absorbing liquid buffer tank 24 is sent to a liquid disperser 31 provided at the top of the absorption tower 21 by the pump 72 after being re-cooled by the heat exchanger 75. The lean liquid 11 drops toward the bottom of the absorption tower 21, and comes into contact with and absorbs the carbon dioxide containing exhaust gas 1 as described above.

The amine capturing tower 22 includes an amine water washing capturing unit 53, and a pre-amine capturing unit 52 which is provided between the amine water washing capturing unit 53 and the absorption tower 21 and which is characteristic of the present embodiment. The pre-amine capturing unit 52 has a liquid disperser 32 provided at its top.

Part of the rich liquid 12 from the bottom of the absorption tower 21 is taken out as a branched rich liquid 13 and then sent to the liquid disperser 32 of the pre-amine capturing unit 52, and dropped toward the bottom. A decarbonated treatment gas 2 released from the absorption tower 21 is sent to the pre-amine capturing unit 52, and comes into countercurrent contact with the rich liquid 12 dropped from the liquid disperser 32. As a result, the amine compound entrained in the decarbonated treatment gas 2 is trapped and captured in the branched rich liquid 13, and temporarily retained in a pre-amine capturing unit liquid reservoir 57. An amine absorbing rich liquid 14 in the pre-amine capturing unit liquid reservoir 57 is added to the lean liquid 11 from the absorbing liquid buffer tank 24 and then introduced into the absorption tower 21 in the present embodiment.

The amine water washing capturing unit 53 has a one-stage configuration in the present embodiment, and traps and captures a slight amount of decarbonated treatment gas absorbing amine which has not been trapped in the pre-amine capturing unit 52. Washing water 15 having stronger amine trapping force than the rich liquid is sent to a liquid disperser 33 and then dispersed and dropped to the amine water washing capturing unit 53. The washing water 15 traps remaining amine contained in the treatment gas which has passed through the pre-amine capturing unit 52, thereby suppressing the amount of amine scattered to the atmosphere. The washing water 15 which has trapped and captured the amine compound comes into a liquid reservoir 58 at the bottom of the amine water washing capturing unit 53, and is then again sent to the liquid disperser 33 by the pump 73 and thereby circulated and used. At the same time, the washing water is cooled to a predetermined temperature by the heat exchanger 77, and increases its amine trapping force accordingly. If, for example, sulfuric acid, nitric acid, phosphoric acid, acetic acid, boric acid, or oxalic acid is added to the washing water 15, the amine trapping force can be further enhanced. In the present embodiment, the amine water washing capturing unit 53 corresponds to, for example, a water washing capturing unit.

Demisters 39 and 40 are respectively provided at the latter stages (tops) of the liquid dispersers 32 and 33 of the pre-amine capturing unit 52 and the amine water washing capturing unit 53. Demisters 39 and 40 trap absorbing liquid mist and washing water mist entrained in the decarbonated treatment gas 2 and capture the mists in the lean liquid 11 and the washing water 15, respectively. In the same manner, a demister 38 is also provided at the latter stage (top) of the liquid disperser 31 which is provided at the top of the absorption tower 21. Thus the demister 38 traps the absorbing liquid mist entrained in the decarbonated treatment gas 2 and captures the mist in the absorption tower 21.

The amine compound contained in the absorbing liquid includes monoethanolamine; alcoholic hydroxyl group containing primary amines such as 2-amino-2-methyl-1-propanol; alcoholic hydroxyl group containing secondary amines such as diethanolamine and 2-methylaminoethanol; alcoholic hydroxyl group containing tertiary amines such as triethanolamine and N-methyldiethanolamine; polyethylene polyamines such as ethylenediamine, triethylenediamine, and diethylenetriamine; cyclic amines such as piperazines, piperidines, and pyrrolidines; polyamines such as xylylenediamine; amino acids such as methylamino carboxylic acid; and mixtures of the above substances. These amines are normally used as a 10 to 70 weight percent water liquid. To the absorbing liquid, it is possible to add a carbon dioxide absorption promoting agent or a corrosion inhibitor, and as an additional medium, methanol, polyethylene glycol, or sulfolane, for example.

In the present embodiment, the branched rich liquid 13 is cooled by the heat exchanger 76 before introduced into the pre-amine capturing unit 52.

In general, the amine absorbing liquid or the amine water washing liquid is lower in amine steam pressure in a gas phase at a lower temperature, and therefore increases the force of trapping the treatment gas entrained amine.

In the present embodiment, the rich liquid which has been cooled by the heat exchanger 76 is used to capture amine. Therefore, the amine compound can be trapped by high trapping force and can be reused.

In the aspects described in the present embodiment and the following embodiments, the rich liquid 12 is branched between the pump 71 and the heat exchanger 79 as a simple way to take part of the rich liquid 12 from the bottom of the absorption tower 21 and to send this part to the liquid disperser 32 of the pre-amine capturing unit 52. However, the supply of the rich liquid to the pre-amine capturing unit 52 is not limited to these manners. For example, a separate pipe may be provided between the bottom of the absorption tower 21 and the pre-amine capturing unit 52, and the rich liquid may be directly supplied independently of the flow of the rich liquid from the absorption tower 21 to the regeneration tower 23.

(2) Embodiment 2

Figure 2:
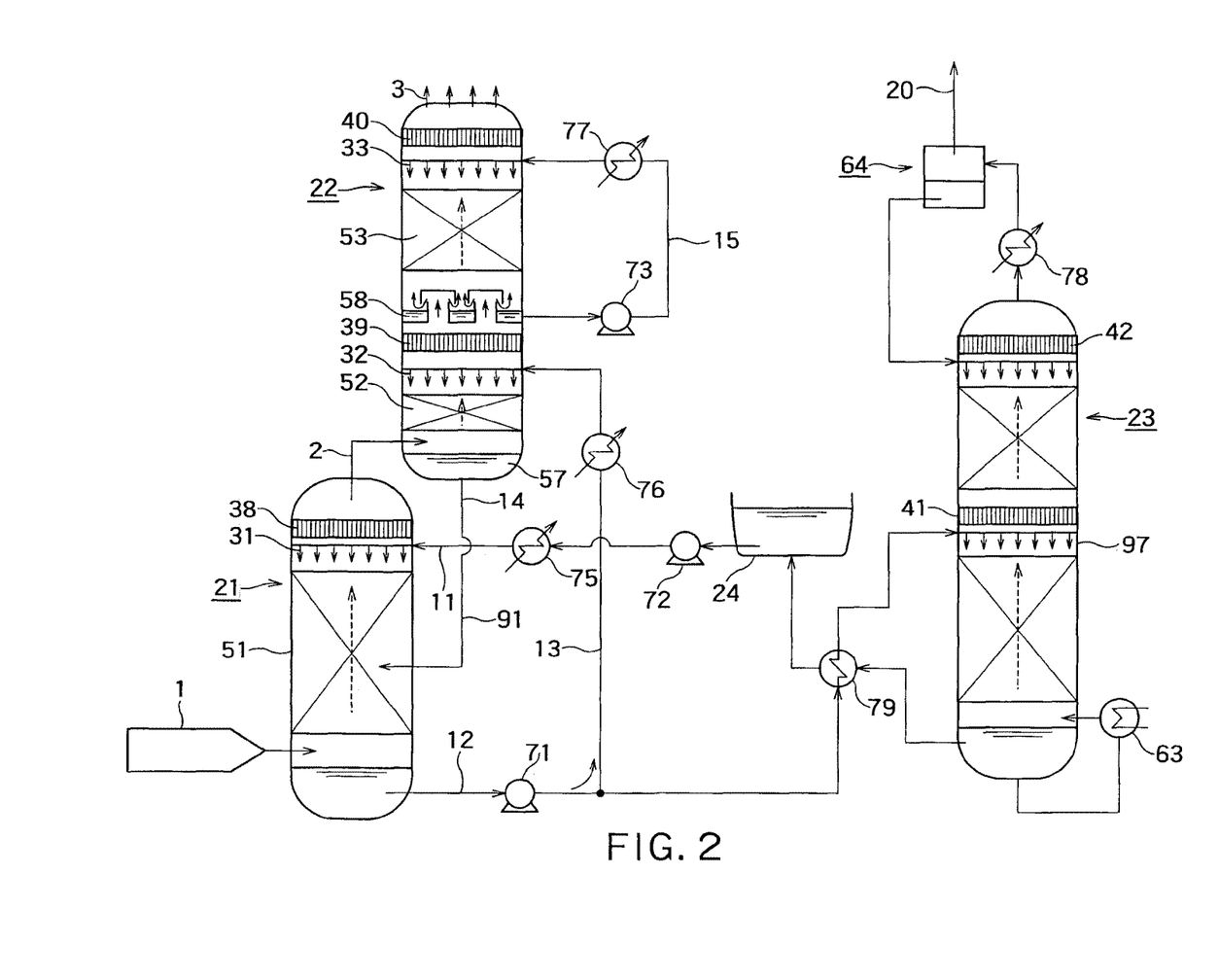
FIG. 2 is a diagram showing a schematic configuration of a carbon dioxide capturing apparatus according to Embodiment 2.

FIG. 2 is a diagram showing a schematic configuration of a carbon dioxide capturing apparatus according to Embodiment 2. As apparent from the contrast with FIG. 1, the carbon dioxide capturing apparatus according to the present embodiment is characterized in that the amine absorbing rich liquid 14 retained in the pre-amine capturing unit liquid reservoir 57 is not added to the lean liquid 11 from the absorbing liquid buffer tank 24 but introduced into a middle stage of a carbon dioxide capturing unit 51 via a pipe 91. The configuration according to the present embodiment is substantially the same as the above-described configuration according to Embodiment 1 in other respects.

For efficient absorption of carbon dioxide in the absorption tower 21, it is preferable that the whole absorption tower 21 is at a uniform temperature from the viewpoint of gas-liquid equilibrium and the temperature dependence of absorption speed. However, since the lean liquid 11 generates heat of liquid by absorbing carbon dioxide in the absorption tower 21, the temperature in the absorption tower 21 tends to increase from the top to the bottom. In the present embodiment, the rich liquid 14 which has been cooled in advance by the heat exchanger 76 and which has been used to capture the amine compound in the pre-amine capturing unit 52 is input to a middle stage portion of the absorption tower 21 via the pipe 91, and is thereby used to inhibit the increase of the liquid temperature at the bottom of the absorption tower 21. In the present embodiment, the pipe 91 corresponds to, for example, a first pipe.

Thus, according to the present embodiment, the rich liquid 14 which has been used to capture the amine compound in the pre-amine capturing unit 52 is introduced into the middle stage portion of the absorption tower 21, thereby providing a cooling effect in the absorption tower 21. Therefore, it is possible to further increase carbon dioxide absorbing efficiency, reduce the amount of the absorbing liquid, or reduce the height of the absorption tower.

(3) Embodiment 3

Figure 3:
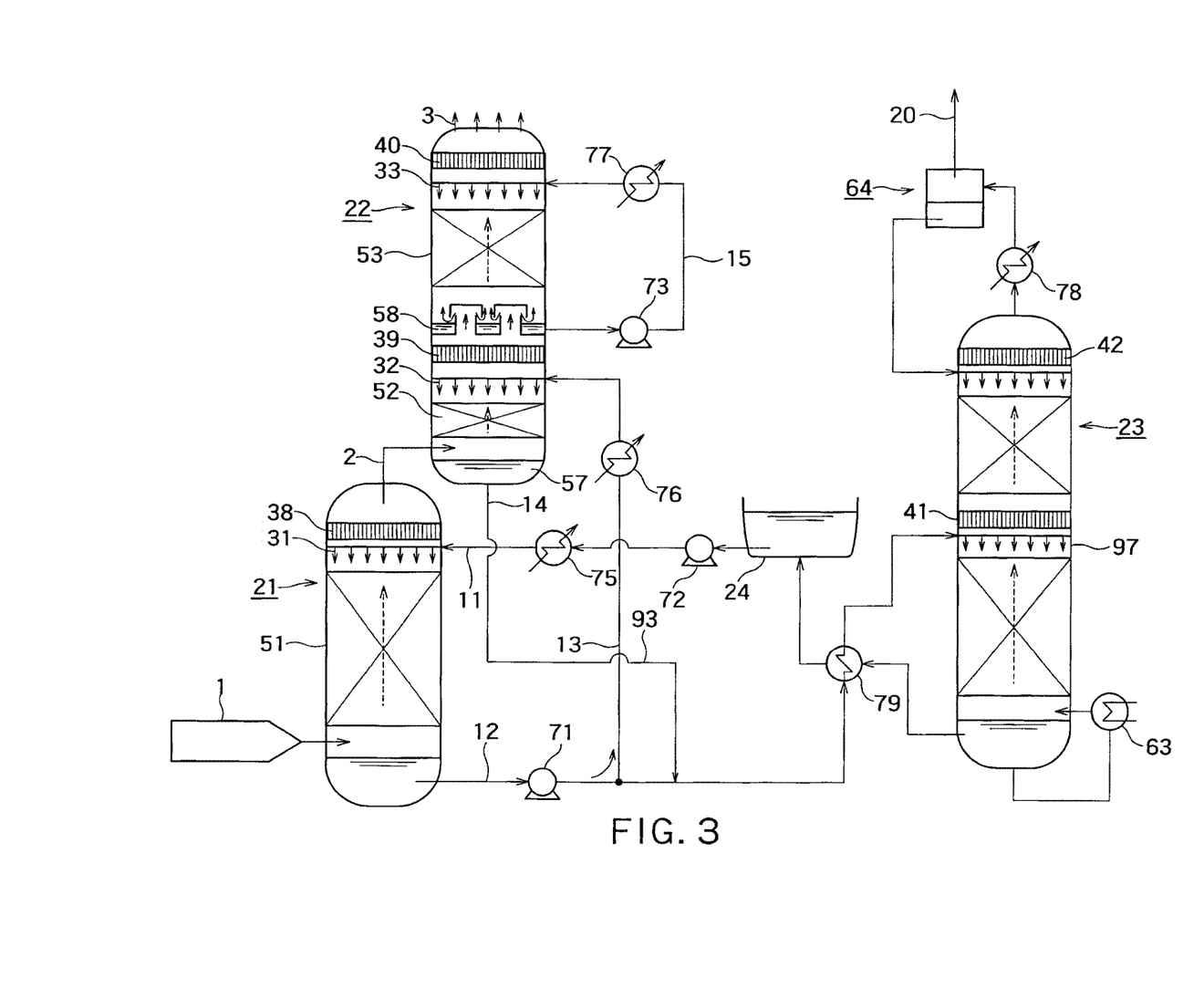
FIG. 3 is a diagram showing a schematic configuration of a carbon dioxide capturing apparatus according to Embodiment 3.

FIG. 3 is a diagram showing a schematic configuration of a carbon dioxide capturing apparatus according to Embodiment 3. As apparent from the contrast with FIG. 1, the carbon dioxide capturing apparatus according to the present embodiment is characterized in that the amine absorbing rich liquid 14 retained in the pre-amine capturing unit liquid reservoir 57 is not added to the lean liquid 11 from the absorbing liquid buffer tank 24 but is continuously returned to the rich liquid 12 via a pipe 93. The configuration according to the present embodiment is substantially the same as the above-described configuration according to Embodiment 1 in other respects.

The place to return the amine absorbing rich liquid 14 to the main stream of the rich liquid 12 is preferably the downstream of a diverting point where the rich liquid 12 is taken as the branched rich liquid 13 for introduction into the pre-amine capturing unit 52, specifically, a position closer to the regeneration tower 23 than the diverting point and a place before the regenerated heat exchanger 79.

(4) Embodiment 4

Figure 4:
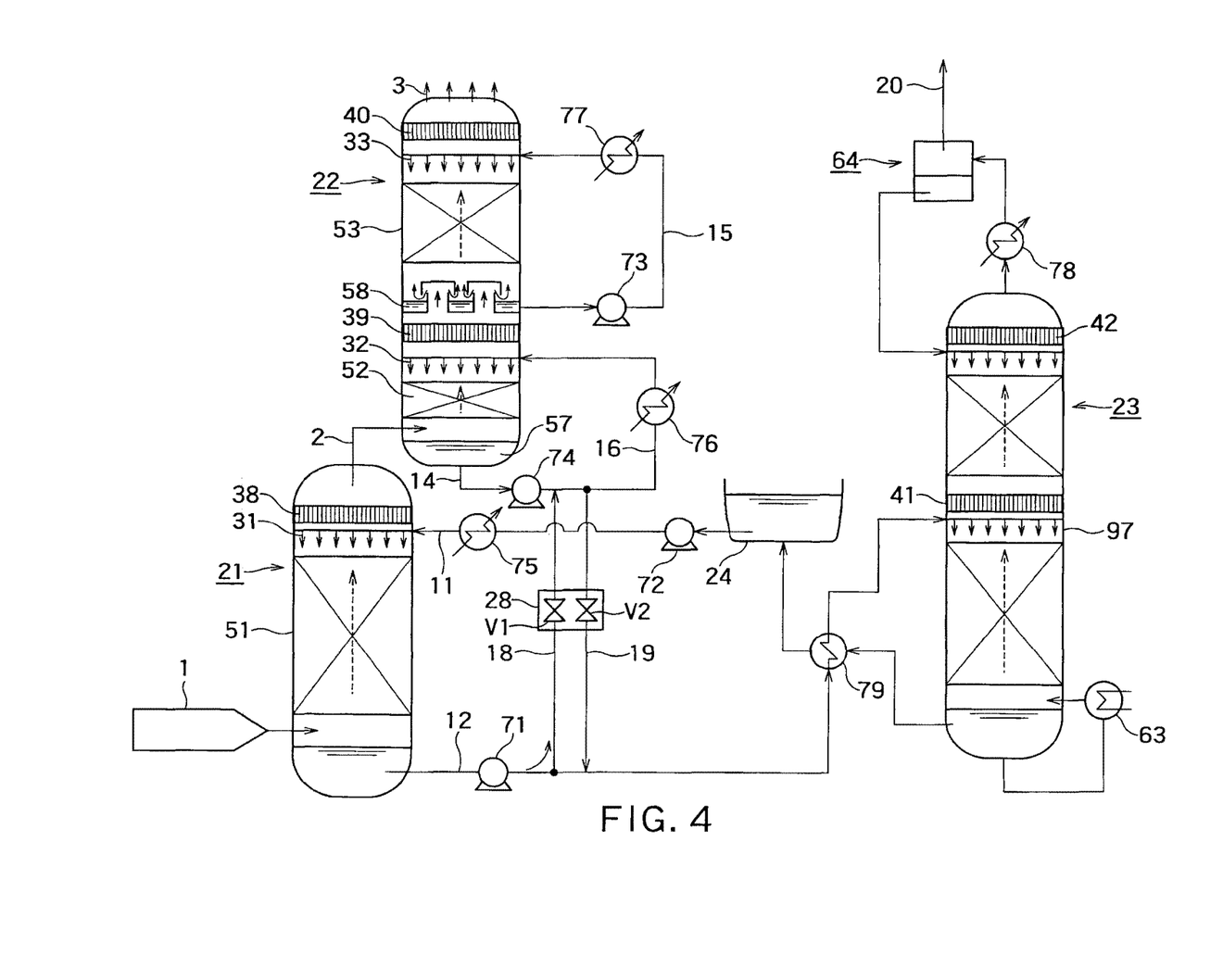
FIG. 4 is a diagram showing a schematic configuration of a carbon dioxide capturing apparatus according to Embodiment 4.

FIG. 4 is a diagram showing a schematic configuration of a carbon dioxide capturing apparatus according to Embodiment 4. As apparent from the contrast with FIG. 1, the carbon dioxide capturing apparatus according to the present embodiment is characterized by further including a pump 74, a circulating pipe 16, a pipe 19, and a changeover unit 28.

The pump 74 is provided between the pre-amine capturing unit liquid reservoir 57 and the heat exchanger 76, and circulates the amine absorbing rich liquid 14 through the circulating pipe 16. In the present embodiment, the pump 74 and the circulating pipe 16 correspond to, for example, a circulating mechanism.

The pipe 19 is provided closer to the regeneration tower 23 than a pipe 18 for introducing the branched rich liquid into the circulating pipe 16. Thus the pipe 19 returns the amine absorbing rich liquid 14 to the main stream of the rich liquid 12 from the circulating pipe 16. The changeover unit 28 includes valves V1 and V2 respectively provided in the pipes 18 and 19, and controls the introduction of the branched rich liquid into the pre-amine capturing unit 52 and the withdrawal of the amine absorbing rich liquid 14 into the main stream of the rich liquid 12.

The branched rich liquid which has been branched out of the main stream of the rich liquid 12 and then introduced into the liquid disperser 32 is temporarily retained in the pre-amine capturing unit liquid reservoir 57 as the amine absorbing rich liquid 14 which has absorbed the amine compound by dropping, and then again sent to the liquid disperser 32 by the pump 74, and circulated and used. At the same time, the amine absorbing rich liquid 14 is cooled to a predetermined temperature by the heat exchanger 76. However, as the rich liquid circulated and used, carbon dioxide in the rich liquid gradually escapes. Accordingly, the changeover unit 28 changes the rich liquid. The changeover unit 28 has both a manual mode and an automatic mode. In the manual mode by an operator, the valve V1 is opened to introduce the branched rich liquid into the pre-amine capturing unit 52, and at the same time, the valve V2 is opened to take out the amine absorbing rich liquid 14 from the pre-amine capturing unit 52 into the main stream of the rich liquid 12.

Figure 5:
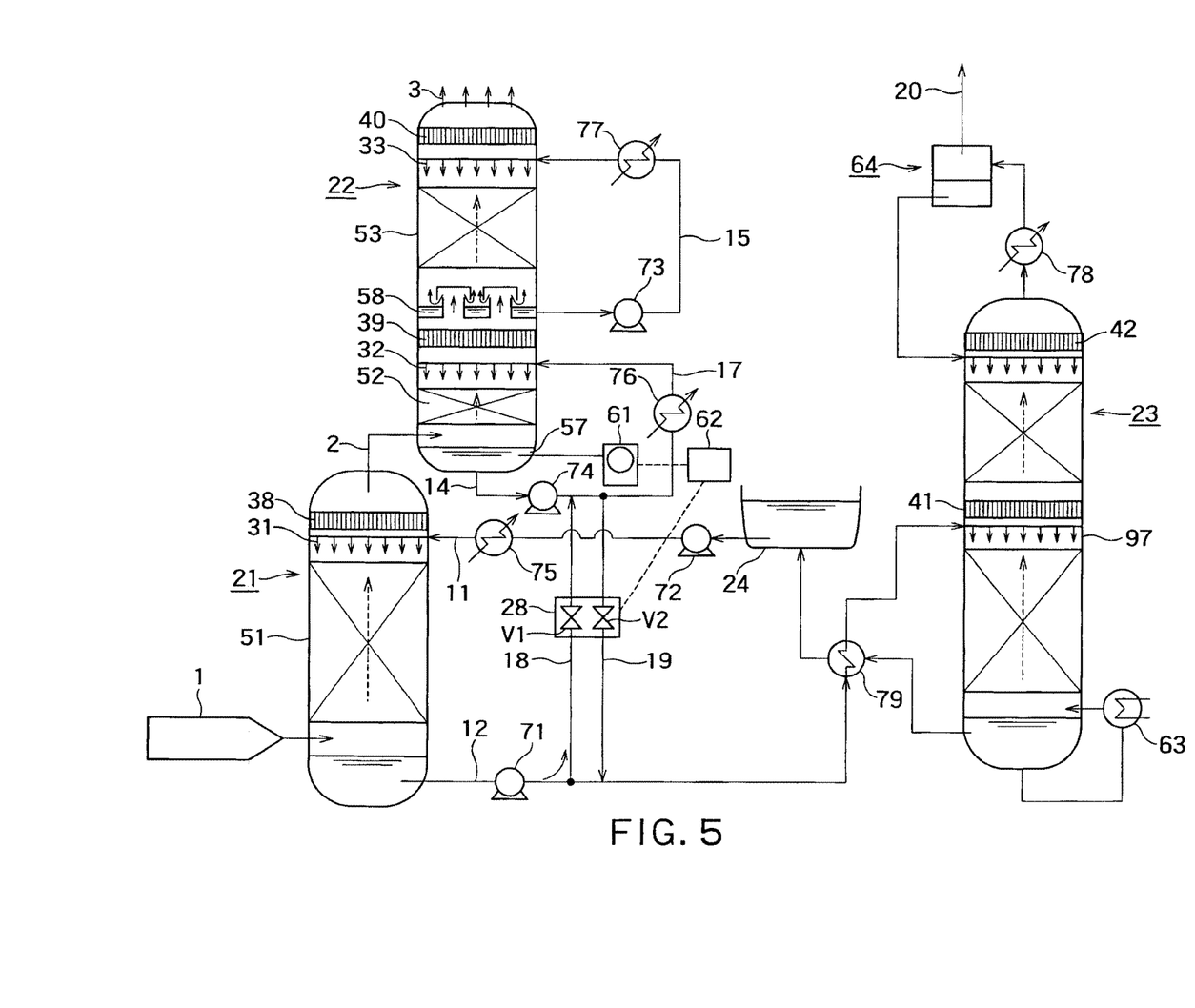
FIG. 5 is a diagram showing an example of a specific configuration of a carbon dioxide capturing apparatus which includes automatic control part for exchanging a rich liquid.

FIG. 5 is a diagram showing a configuration example of a carbon dioxide capturing apparatus which includes an automatic control part for exchanging the rich liquid. The carbon dioxide capturing apparatus in this example further includes a carbon dioxide concentration measuring instrument 61 and a calculator 62 in addition to the configuration in FIG. 4.

The carbon dioxide concentration measuring instrument 61 measures the carbon dioxide concentration in the amine absorbing rich liquid 14 retained in the pre-amine capturing unit liquid reservoir 57, and sends the measurement result to the calculator 62. The calculator 62 compares the measurement result with a preset threshold of the carbon dioxide concentration. When the measurement result is less than the threshold, the calculator 62 generates a command signal and sends the command signal to the changeover unit 28. The changeover unit 28 which has received the command signal switches to the automatic mode, and opens the valve V1 to introduce the branched rich liquid into the pre-amine capturing unit 52. At the same time, the changeover unit 28 opens the valve V2 to take out the amine absorbing rich liquid 14 from the pre-amine capturing unit 52 into the main stream of the rich liquid 12. At the point where a predetermined carbon dioxide concentration is ensured, a command to close the valves V1 and V2 is output to the changeover unit 28 from the calculator 62. The carbon dioxide concentration measuring instrument 61 can be, for example, a density measuring instrument, a pH measuring instrument, an ultrasonic wave measuring instrument, an infrared absorption light measuring instrument, a viscosity measuring instrument, or an oxidation reduction potential (ORP) measuring instrument. In the present embodiment, the carbon dioxide concentration measuring instrument 61, the calculator 62, and the changeover unit 28 correspond to, for example, a monitor control unit.

Thus, according to the present embodiment, the amine absorbing rich liquid 14 can be continuously circulated in the pre-amine capturing unit 52 by the pump 74 and the circulating pipe 16, so that the reusable amine absorbing liquid can be acquired by a simple configuration. Moreover, when the predetermined carbon dioxide concentration is ensured by the carbon dioxide concentration measuring instrument 61, the calculator 62, and the changeover unit 28, the treatment gas entrained amine can be stably trapped and absorbed with a high efficiency.

(5) Embodiment 5

Figure 6:
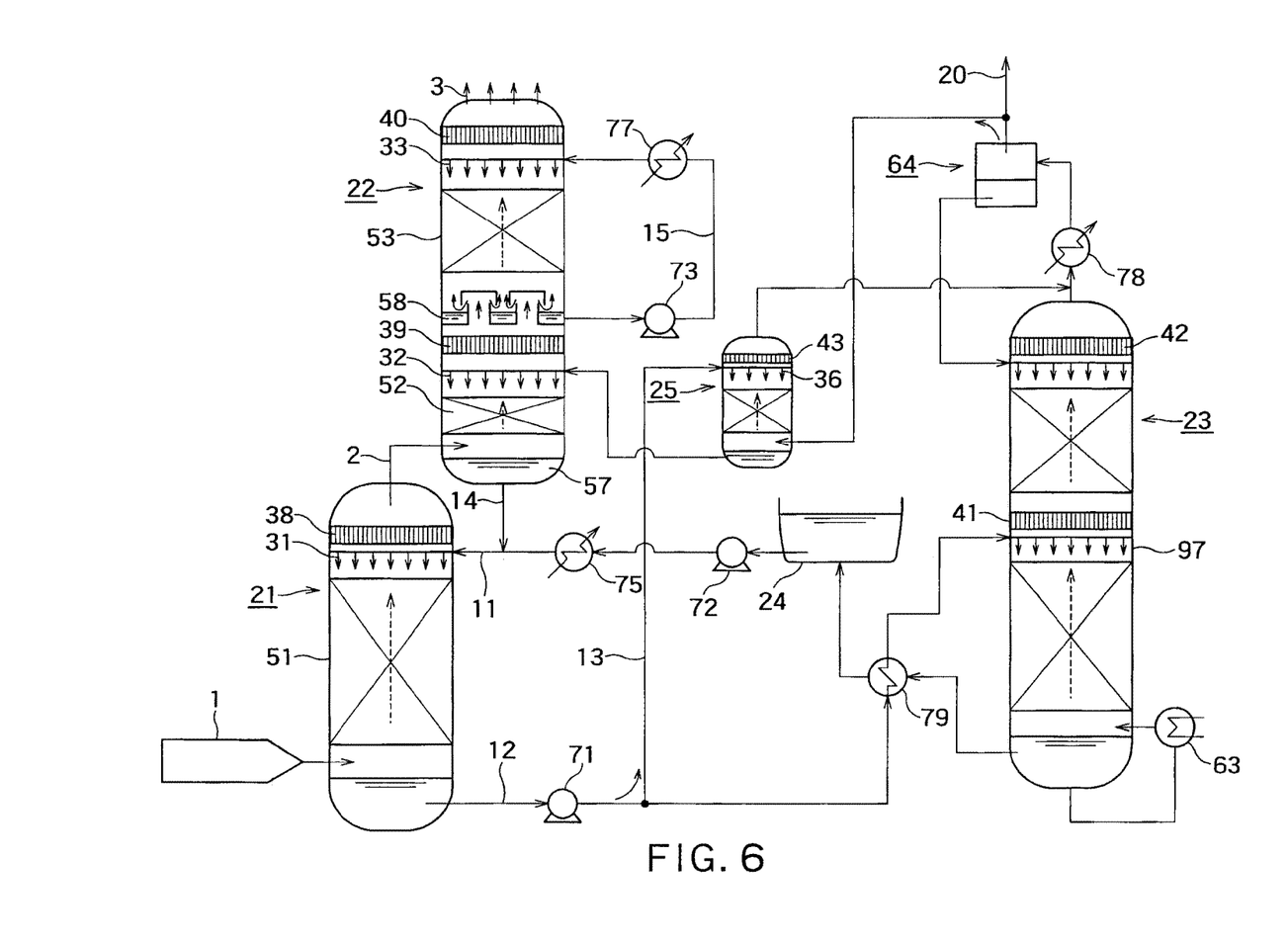
FIG. 6 is a diagram showing a schematic configuration of a carbon dioxide capturing apparatus according to Embodiment 5.

FIG. 6 is a diagram showing a schematic configuration of a carbon dioxide capturing apparatus according to Embodiment 5. As apparent from the contrast with FIG. 1, the carbon dioxide capturing apparatus according to the present embodiment is characterized by including a small absorption tower 25 instead of the heat exchanger 76. The branched rich liquid 13 is introduced into the small absorption tower 25. The small absorption tower 25 brings the branched rich liquid 13 into contact with part of carbon dioxide from the gas-liquid separator 64, and thereby generates a rich liquid having an increased concentration of carbon dioxide and sends the rich liquid to the pre-amine capturing unit 52. The configuration of the carbon dioxide capturing apparatus according to the present embodiment is substantially the same as that of the carbon dioxide capturing apparatus shown in FIG. 1 in other respects.

The small absorption tower 25 has a liquid disperser 36 provided on its top stage, and the branched rich liquid 13 branched out of the main stream of the rich liquid 12 on the downstream of the pump 71 is introduced into the liquid disperser 36. The branched rich liquid 13 is dropped toward a liquid reservoir at the bottom of the small absorption tower 25. Part of carbon dioxide released from the regeneration tower 23 is introduced into a middle stage of the small absorption tower 25 via the gas-liquid separator 64, and comes into countercurrent contact with the branched rich liquid 13 dropped from the liquid disperser 36. As a result, the rich liquid having an increased carbon dioxide concentration is retained at the bottom of the small absorption tower 25, and is sent to the liquid disperser 32 of the pre-amine capturing unit 52. In the present embodiment, the small absorption tower 25 corresponds to, for example, a second absorption tower.

A demister 43 is provided at the top of the small absorption tower 25, traps amine absorbing liquid mist, and deforms the mist into liquid droplet and drops the liquid droplet. Carbon dioxide which has not been absorbed by the branched rich liquid 13 merges into captured carbon dioxide 20 from the regeneration tower 23 before the heat exchanger 78, cooled by the heat exchanger 78. The cooled carbon dioxide is then introduced into the gas-liquid separator 64 where steam is separated, and the steam is released to the outside of the carbon dioxide capturing apparatus.

According to the present embodiment, the small absorption tower 25 brings the branched rich liquid 13 into countercurrent contact with 100% carbon dioxide, so that the branched rich liquid 13 having the increased carbon dioxide concentration can be sent to the pre-amine capturing unit 52. Consequently, the efficiency of absorption of the amine compound into the branched rich liquid 13 is increased, and the amount of amine scattered together with the treatment gas can be further reduced.

(6) Embodiment 6

Figure 7:
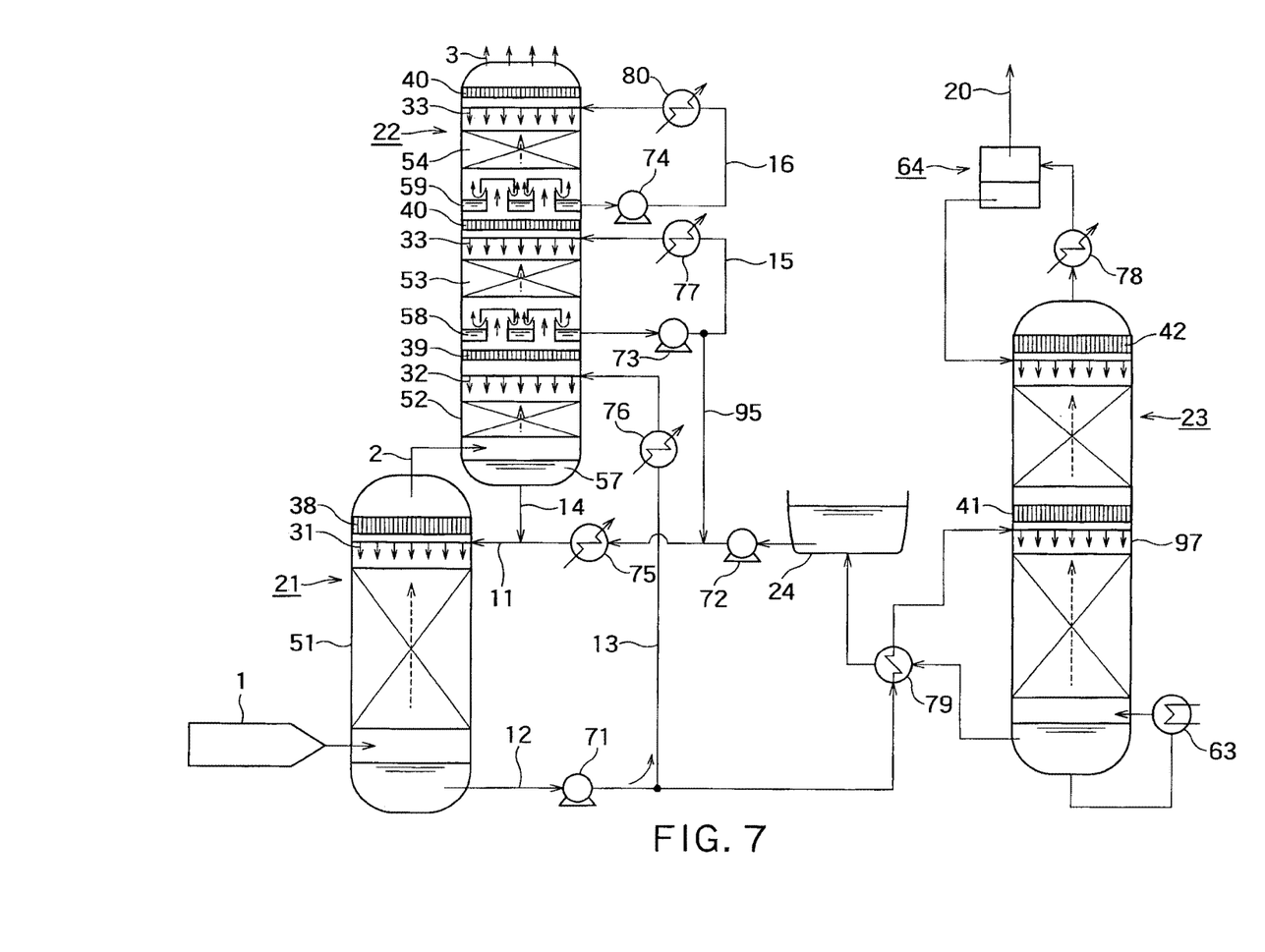
FIG. 7 is a diagram showing a schematic configuration of a carbon dioxide capturing apparatus according to Embodiment 6.

FIG. 7 is a diagram showing a schematic configuration of a carbon dioxide capturing apparatus according to Embodiment 6. As apparent from the contrast with FIG. 1, the carbon dioxide capturing apparatus according to the present embodiment is characterized in that the amine capturing tower 22 includes a plurality of stages of amine water washing capturing units. Although two stages of amine water washing capturing units 53 and 54 are provided at the latter stage of the pre-amine capturing unit 52 in the example shown in FIG. 7, it should be understood that this is not a limitation. Three or more stages of amine water washing capturing units may be provided. The washing water of the amine water washing capturing unit 53 of the foremost stage (bottommost part) is added to the lean liquid 11 via a pipe 95. The configuration of the carbon dioxide capturing apparatus according to the present embodiment is substantially the same as that of the carbon dioxide capturing apparatus shown in FIG. 1 in other respects.

The configuration and operation of the amine water washing capturing unit 53 of the former stage has already been described in Embodiment 1. The configuration and operation of the amine water washing capturing unit 54 of the latter stage are substantially the same as those of the amine water washing capturing unit 53. Specifically, a slight amount of decarbonated treatment gas absorbing amine which has not been trapped in the amine water washing capturing unit 53 is introduced into the amine water washing capturing unit 54. The gas-liquid disperser 33 disperses and drops washing water 16 having stronger amine trapping force than the rich liquid 12, and traps and captures remaining amine in the decarbonated treatment gas. The trapped and captured washing water 16 is retained in a liquid reservoir 59 at the bottom of the amine water washing capturing unit 54, and then again sent to the liquid disperser 33 by the pump 74 and thereby circulated and used. At the same time, the washing water 16 is cooled to a predetermined temperature by the heat exchanger 80, and increases its amine trapping force accordingly. In the present embodiment, the pipe 95 corresponds to, for example, a third pipe.

The advantage of providing a plurality of stages of amine water washing capturing units is as follows: As has previously been described in Embodiment 1, it is necessary to maintain an amine concentration equal to or more than a predetermined concentration in the absorbing liquid (lean liquid) in order to reuse the amine collected by the washing water as the absorbing liquid (lean liquid). Therefore, it is important that the amine concentration in the washing water be as close to the amine concentration in the absorbing liquid as possible. However, if the amine concentration in the washing water is high, the force to trap the treatment gas entrained amine decreases, and the amount of amine scattered to the atmosphere increases.

Thus, in the present embodiment, the amine water washing capturing unit is configured to have a plurality of stages, and the washing water from the foremost stage (bottommost part) where the amine concentration in the washing water is highest is added to the absorbing liquid (lean liquid) via the pipe 95. In this way, the treatment gas entrained amine is efficiently captured and reused. In the meantime, the amine concentration in the washing water is managed in such a manner that the amine concentration is lower on the latter stage (higher stage) of the amine water washing capturing unit, and the amine trapping force of the washing water is increased, and the amount of amine diffused to the atmosphere is thereby reduced. Although not shown in FIG. 7, one possible way is to bypass the washing water to the water washing part of the former stage (bottom stage) via an unshown pipe at the point where the amine concentration in the washing water is equal to or more than a certain standard, and to use the washing water as the washing water of the former stage. As a result, the amine concentration is higher on the former stage (lower stage), and the amine concentration is lower on the latter stage (higher stage). This enables an operation ideal for both the reuse of amine and the inhibition of the diffusion of amine to the atmosphere.

(7) Embodiment 7

Figure 8:
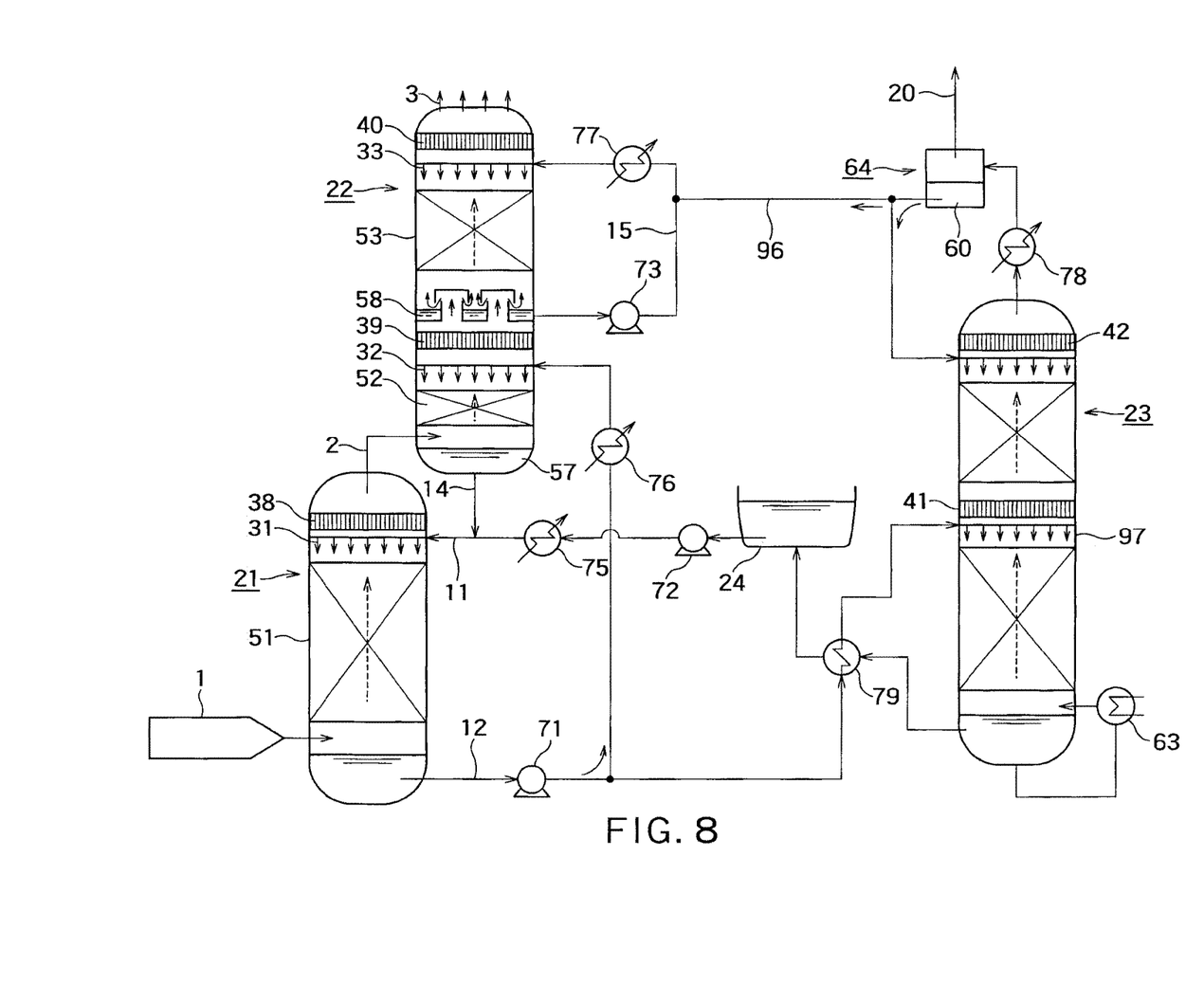
FIG. 8 is a diagram showing a schematic configuration of a carbon dioxide capturing apparatus according to Embodiment 7.

FIG. 8 is a diagram showing a schematic configuration of a carbon dioxide capturing apparatus according to Embodiment 7. As apparent from the contrast with FIG. 1, the carbon dioxide capturing apparatus according to the present embodiment is characterized by including a pipe 96 which adds part of regeneration tower reflux water 60 generated in the gas-liquid separator 64 to the washing water 15 that is circulated and used in the amine water washing capturing unit 53. The configuration of the carbon dioxide capturing apparatus according to the present embodiment is substantially the same as that of the carbon dioxide capturing apparatus shown in FIG. 1 in other respects.

As has previously been described in Embodiment 1, if the concentration of carbon dioxide in the amine absorbing liquid is higher, the amount of the amine compound scattered together with the treatment gas is larger because the amine in the liquid is less volatile. Since the regeneration tower reflux water 60 generated in the gas-liquid separator 64 is in gas-liquid contact with the captured carbon dioxide 20, the concentration of carbon dioxide is considerably high. Accordingly, the regeneration tower reflux water 60 can be sent to the amine water washing capturing unit 53 via the pipe 96 and used as amine washing water to increase the capturing efficiency of the treatment gas entrained amine. As a result, the amount of amine scattered to the atmosphere can be further suppressed. In the present embodiment, the pipe 96 corresponds to, for example, a fourth pipe.

The use of the regeneration tower reflux water 60 as the amine washing water is not limited to the carbon dioxide capturing apparatus illustrated in FIG. 8, and is applicable to any one of the carbon dioxide capturing apparatuses shown in FIG. 2 to FIG. 7, although not shown in particular. Such use is also applicable to the carbon dioxide capturing apparatuses which will be described later with reference to FIG. 8 and FIG. 9.

(8) Embodiment 8

Although the first absorption tower 21 and the amine capturing tower 22 are separated from and independent of each other in the embodiments described above, this is not a limitation. Naturally, it is also possible that these towers are integrally formed.

Figure 9:
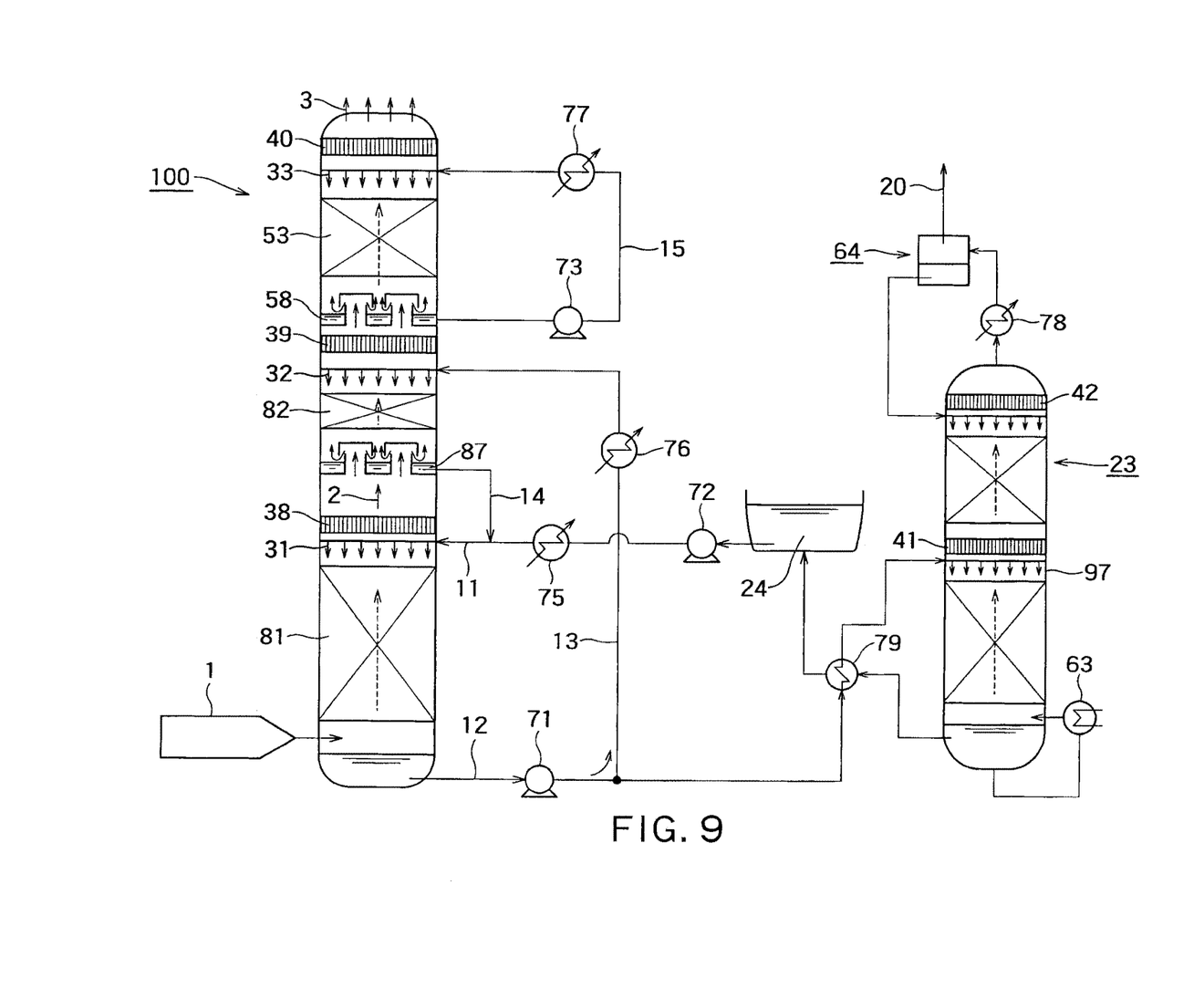
FIG. 9 is a diagram showing a schematic configuration of a carbon dioxide capturing apparatus according to Embodiment 8.

FIG. 9 is a diagram showing a schematic configuration of a carbon dioxide capturing apparatus according to Embodiment 8. As apparent from the contrast with FIG. 1, the carbon dioxide capturing apparatus according to the present embodiment is characterized by including a carbon dioxide absorbing and amine capturing tower 100 instead of the absorption tower 21 and the amine capturing tower 22 shown in FIG. 1. The carbon dioxide absorbing and amine capturing tower 100 includes a first absorbing unit 81, a pre-amine capturing unit 82, and the water washing capturing unit 53. The first absorbing unit 81, the pre-amine capturing unit 82, and the water washing capturing unit 53 are integrally formed so as to be stacked in this order. The configuration of the carbon dioxide capturing apparatus according to the present embodiment is substantially the same as that of the carbon dioxide capturing apparatus shown in FIG. 1 in other respects.

The decarbonated treatment gas 2 released from the first absorbing unit 81 is directly sent to the pre-amine capturing unit 82 without passing through an external pipe. The decarbonated treatment gas 2 comes into countercurrent contact with the rich liquid 12 dropped from the liquid disperser 32. As a result, the amine compound entrained in the decarbonated treatment gas 2 is trapped and captured in the branched rich liquid 13, and temporarily retained in a pre-amine capturing unit liquid reservoir 87. The operation of the carbon dioxide absorbing and amine capturing tower 100 is substantially the same as those of the absorption tower 21 and the amine capturing tower 22 shown in FIG. 1 in other respects.

According to the present embodiment, the first absorbing unit 81, the pre-amine capturing unit 82, and the water washing capturing unit 53 are integrally formed, so that the carbon dioxide absorbing and amine capturing tower 100 can be lower in height than the absorption tower 21 and the amine capturing tower 22 shown in FIG. 1.

(9) Embodiment 9

Although the pre-amine capturing unit and the water washing capturing unit are integrally formed as the amine capturing tower 22 in the first to seventh embodiments described above, this is not a limitation. For example, it is naturally also possible that the pre-amine capturing unit is separated from the water washing capturing unit and formed integrally with the first absorbing unit.

Figure 10:
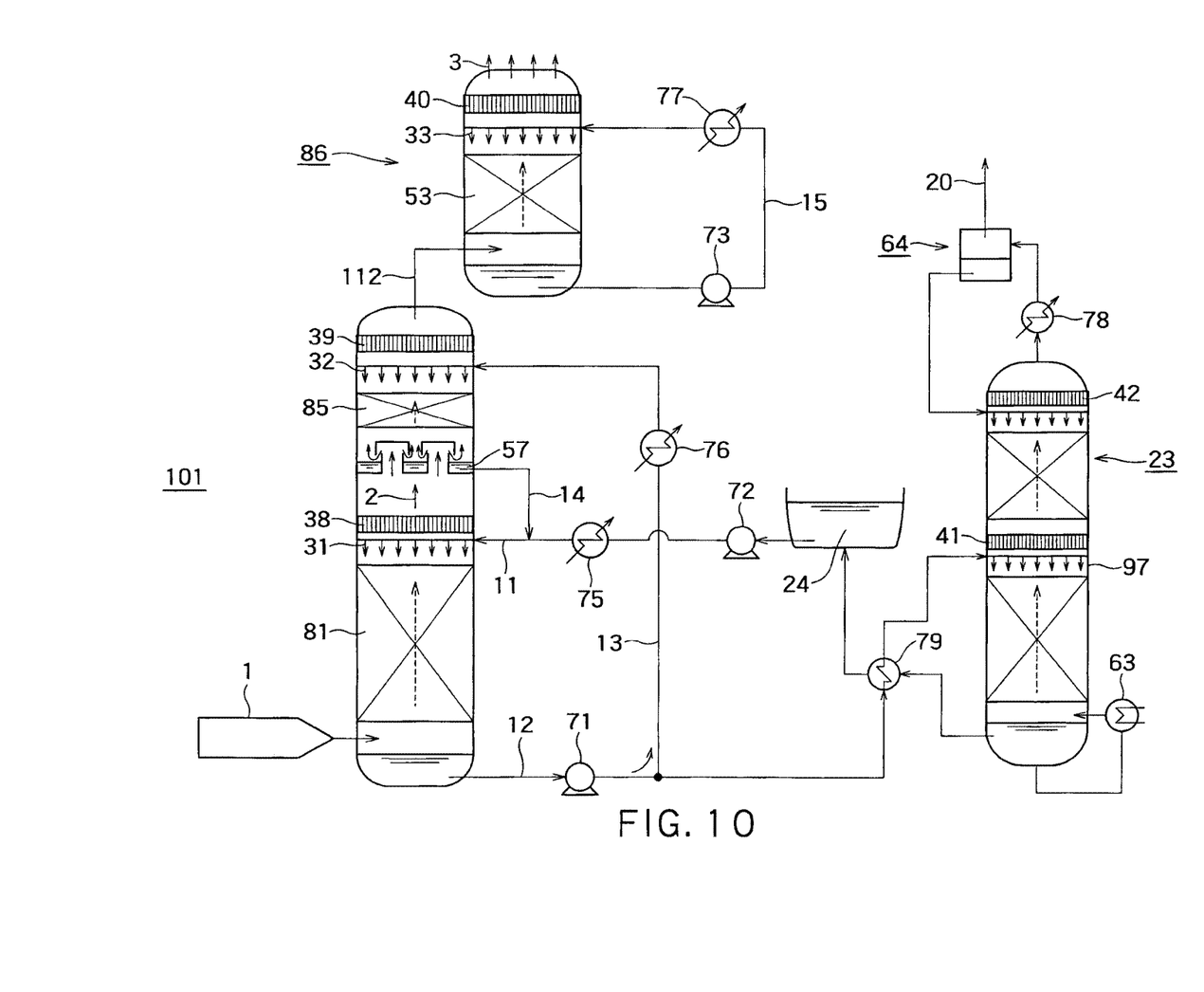
FIG. 10 is a diagram showing a schematic configuration of a carbon dioxide capturing apparatus according to Embodiment 9.

FIG. 10 is a diagram showing a schematic configuration of a carbon dioxide capturing apparatus according to Embodiment 9. As apparent from the contrast with FIG. 1, the carbon dioxide capturing apparatus according to the present embodiment is characterized by including a carbon dioxide absorbing and pre-amine capturing tower 101 and a water washing capturing tower 86 instead of the absorption tower 21 and the amine capturing tower 22 shown in FIG. 1. The carbon dioxide absorbing and pre-amine capturing tower 101 includes the first absorbing unit 81 and a pre-amine capturing unit 85. The first absorbing unit 81 and the pre-amine capturing unit 85 are integrally formed so as to be stacked in this order. The configuration of the carbon dioxide capturing apparatus according to the present embodiment is substantially the same as that of the carbon dioxide capturing apparatus shown in FIG. 1 in other respects.

A slight amount of decarbonated treatment gas absorbing amine which has not been trapped in the pre-amine capturing unit 85 is introduced into the water washing capturing tower 86 from the pre-amine capturing unit 85 via a pipe 112. Thus the slight amount of decarbonated treatment gas absorbing amine is trapped in the water washing capturing tower 86 by coming into countercurrent contact with the washing water 15 dispersed and dropped from the liquid disperser 33. As a result, the amount of amine scattered to the atmosphere is suppressed. The operations of the carbon dioxide absorbing and pre-amine capturing tower 101 and the water washing capturing tower 86 are substantially the same as those of the absorption tower 21 and the amine capturing tower 22 shown in FIG. 1 in other respects.

The carbon dioxide capturing apparatus according to at least one of the embodiments described above has the pre-amine capturing unit provided between the first absorbing unit and the water washing capturing unit. The pre-amine capturing unit receives part of the rich liquid from the first absorbing unit, and then traps the treatment gas entrained amine by bringing the decarbonated treatment gas from the first absorbing unit into countercurrent contact with the part of the rich liquid. Consequently, it is possible to suppress amine scattered to the atmosphere, and efficiently capture the treatment gas entrained amine and reuse the treatment gas entrained amine as the absorbing liquid (lean liquid).

According to the carbon dioxide capturing method in at least one of the embodiments described above, capturing the amine compound includes drawing part of the rich liquid and bringing the decarbonated treatment gas into countercurrent contact with the part of the rich liquid to trap the amine compound. Consequently, it is possible to suppress amine scattered to the atmosphere, and efficiently capture the treatment gas entrained amine and reuse the treatment gas entrained amine as the absorbing liquid (lean liquid).

Furthermore, according to the amine compound capturing method in at least one of the embodiments described above, part of the rich liquid is drawn and the treatment gas entrained amine is trapped by bringing the part of the rich liquid into countercurrent contact with the decarbonated treatment gas obtained by removing carbon dioxide from the gas containing carbon dioxide. The rich liquid is the absorbing liquid that has absorbed carbon dioxide by bringing the gas containing carbon dioxide into contact with the absorbing liquid containing the amine compound. Consequently, it is possible to suppress the amount of amine scattered to the atmosphere, and efficiently capture the treatment gas entrained amine and reuse the treatment gas entrained amine as the absorbing liquid (lean liquid).

While certain embodiments of the present invention have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A carbon dioxide capturing apparatus comprising:
a first absorbing unit configured to discharge a rich liquid that absorbs carbon dioxide contained in a supplied gas into an absorbing liquid that contains an amine compound and to discharge the supplied gas as a decarbonated treatment gas, the first absorbing unit comprising a supplying port configured to introduce the absorbing liquid thereto, the first absorbing unit further comprising a liquid disperser and a demister which is provided at the latter stage of the liquid disperser and which traps a mist of the absorbing liquid;
a regeneration unit configured to regenerate the absorbing liquid by releasing the carbon dioxide in the rich liquid discharged from the first absorbing unit, and to discharge the absorbing liquid regenerated therein as a lean liquid to the supplying port of the first absorbing unit;
a water ashing capturing unit configured to capture the amine compound that is entrained in the decarbonated treatment gas; and
a pre-amine capturing unit provided between the demister of the first absorbing unit and the water washing capturing unit and provided above the supplying port, the pre-amine capturing unit being configured to bring a part of the rich liquid into contact with the decarbonated treatment gas to capture the amine compound that is entrained in the decarbonated treatment gas before the water washing capturing unit captures the amine compound that is entrained in the decarbonated treatment gas, wherein
part of the rich liquid discharged from the first absorbing unit is provided to a liquid disperser of the pre-amine capturing unit, and
the carbon dioxide capturing apparatus further comprises a pipe configured to send an amine absorbing rich liquid discharged from the water washing capturing unit and the pre-amine capturing unit to the absorbing liquid, a middle stage portion of the first absorbing unit, or the rich liquid.

2. The carbon dioxide capturing apparatus of claim 1, further comprising a circulating line configured to draw and return the part of the rich liquid from the bottom to the top of the pre-amine capturing unit.

3. The carbon dioxide capturing apparatus of claim 2, further comprising
- a detector configured to detect concentration of carbon dioxide in the part of the rich liquid being circulated; and
- a controller configured to control, in accordance with the concentration detected with the detector, a first amount of the rich liquid to be introduced into the pre-amine capturing unit from the first absorbing unit and a second amount of the rich liquid to be discharged from the pre-amine capturing unit.

4. The carbon dioxide capturing apparatus of claim 1, further comprising a second absorption unit configured to bring part of carbon dioxide released from the regeneration unit into contact with the part of the rich liquid from the first absorbing unit, and supply the pre-amine capturing unit with rich liquid which has absorbed carbon dioxide in such a manner that the carbon dioxide concentration of this rich liquid is higher than the carbon dioxide concentration of the rich liquid from the first absorbing unit.

5. The carbon dioxide capturing apparatus of claim 1, wherein the first absorbing unit and the pre-amine capturing unit, or the first absorbing unit, the pre-amine capturing unit, and the water washing capturing unit are integrally formed.

6. The carbon dioxide capturing apparatus of claim 1, wherein a plurality of stages of the water washing capturing units are provided,
- the carbon dioxide capturing apparatus further comprising a pipe configured to draw a washing liquid from at least the water washing capturing unit of the bottommost stage except for the topmost stage to add the washing liquid to the absorbing liquid.

7. The carbon dioxide capturing apparatus of claim 1, further comprising a gas-liquid separator configured to separate steam from carbon dioxide gas released from the regeneration unit to return the steam to the regeneration unit as reflux water, and
- a pipe configured to send the reflux water to the water washing capturing unit.

8. The carbon dioxide capturing apparatus of claim 1, wherein a rich liquid discharged from the pre-amine capturing unit is added to the absorbing liquid provided to the first absorbing unit.

* * * * *